United States Patent [19]

Yes

[11] Patent Number: 4,851,275

[45] Date of Patent: Jul. 25, 1989

[54] COVERING USED TO PROTECT WATER CONDITIONS OF NURSERY POOL FROM DAMAGE BY ACID RAIN AND EXTRAORDINARY TEMPERATURES

[76] Inventor: Johnson Yes, No. 9, Sheh-Tzu St., Shih-Lin, Taipei, Taiwan

[21] Appl. No.: 142,448

[22] Filed: Jan. 11, 1988

[51] Int. Cl.$^4$ .............................................. B32B 3/00
[52] U.S. Cl. .................... 428/131; 428/192; 4/498; 4/499; 4/500; 4/501; 4/502; 220/216; 220/217; 220/219
[58] Field of Search .................. 4/498, 499, 500, 501, 4/502; 220/216, 217, 219; 428/131, 192

[56] References Cited

U.S. PATENT DOCUMENTS 4,000,527  1/1977  Gannon ................................. 4/499
4,022,232  5/1977  Ross et al. ............................ 4/498
4,173,043  11/1979  Vernon ................................. 4/502

Primary Examiner—Henry F. Epstein
Assistant Examiner—P. J. Ryan
Attorney, Agent, or Firm—Jeffers, Hoffman & Niewyk

[57] ABSTRACT

This invention discloses a covering comprising a floating member shaped as a square loop, one pair of opposite portions of which are inflatable members, and a water-proof sheet having a nipple downwardly formed thereon, which is loosely stretched inside the square ring of the floating member and the peripheral edge of which is tightly connected with the same. The covering can float on the water and shield the water from scorching sunshine, killing frost, strong wind and acid rain. It is adaptable, therefore, to be used in nursery pool to protect the crops raised therein from damage by extraordinary weather.

3 Claims, 4 Drawing Sheets

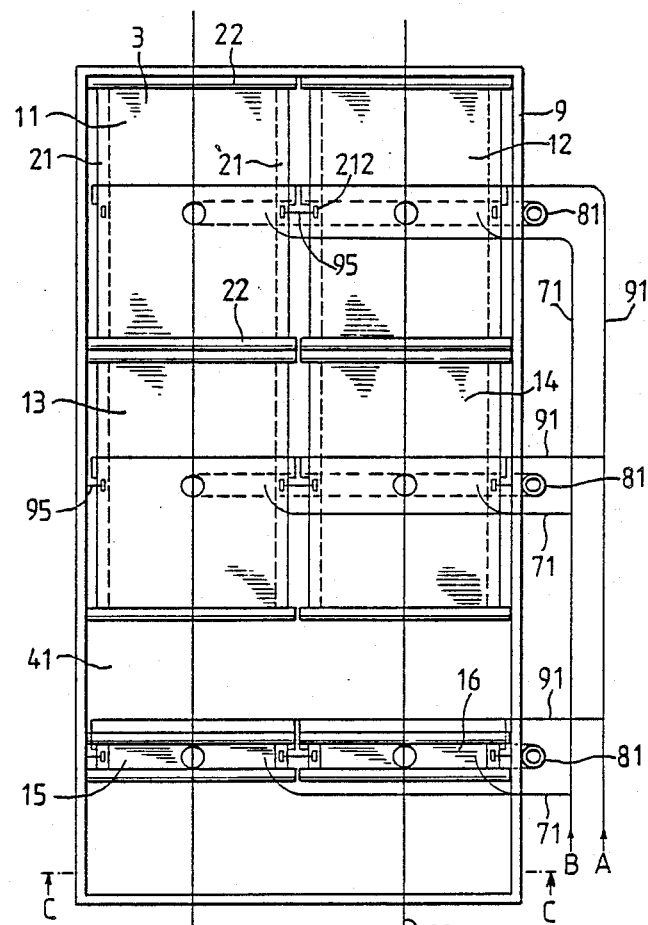
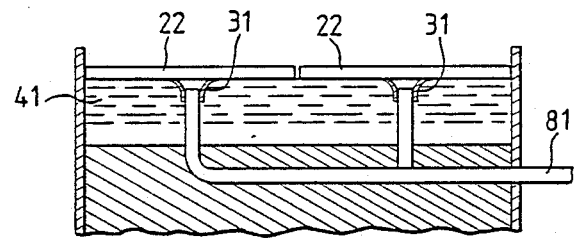

COVERING USED TO PROTECT WATER CONDITIONS OF NURSERY POOL FROM DAMAGE BY ACID RAIN AND EXTRAORDINARY TEMPERATURES

BACKGROUND OF THE INVENTION

The present invention relates to a covering which shields a nursery pool, and more particulary to a covering used to protect the water conditions of a nursery pool from damage by acid rain and extraordinary temperatures.

As is well known, acid rain is a world-wide problem, which seriously damages earth, water and plants. Farmers have to protect their crops against acid rain themselves, because, until now, an accessible countermeasure for directly solving this problem has never been developed. Vinyl covering sheets are usually used to shield crops from damage by adverse environmental conditions, such as scorching sunshine, cold frost, strong wind and heavy rain. However, these vinyl sheets can not be adapted to shield water plants or fish being raised within nursery pools from damage by acid rain and extraordinary temperatures. A vinyl covering sheet can not float on a nursery pool and tightly shield the same from ventilation with the environmental atmosphere, and further more, the rain water collected on the vinyl covering sheet will gradually increase and eventually collapse the frame temporarily constructed for supporting the vinyl covering sheet above the water of the nursery pool.

SUMMARY OF THE INVENTION

Therefore, an object of the present invention is to provide a covering without any supports which can float on the water so as to shield the water or the crops being raised in the water from sunburn.

Another object of the present invention is to provide a covering which can tightly shield the water from ventilation with the environmental atmosphere so as to protect the crops being raised in the water from damage by extraordinary temperatures.

A further object of the present invention is to provide a covering which can constitute an air cushion for insulating the water from the environmental atmosphere so as to protect the crops being raised in the water from damage by extraordinary temperatures.

A still further object of the present invention is to provide a covering, the rain water collected on which can be readily removed.

That is to say, the general object of the present invention is to provide a covering which can be used to protect the water of a nursery pool from damage by extraordinary conditions occuring in the environmental atmosphere.

Accordingly, the present invention provides a covering comprising a floating member shaped as a closed loop and a water-proof sheet which is loosely stretched inside the closed loop shape of the floating member and the peripheral edge of which is tightly connected with the same. Therefore, not only can the covering float on water and tightly shield the water but the space between the above-mentioned water-proof sheet and the water can also be filled with air via an air tube temporarily extended through the water into said space to constitute an air cushion for insulating the water from the environmental atmosphere.

If necessary, a fastener can be formed under the water-proof sheet, such as in the internal side of the floating member or on the bottom surface of the water-proof sheet, for afixing the above-mentioned air tube in an appropriate position. A nipple upwardly formed in the water-proof sheet for connecting the air tube may also be considered.

Preferably, the above-mentioned water-proof sheet further comprises at least one nipple downwardly formed thereon so as to guide the rain water collected on the top surface of the water-proof sheet via a tube, additionally connected with the nipple, away from the covering and the water.

Preferably, the above-mentioned floating member is a closed loop having two pairs of opposite portions, wherein one pair of opposite portions are a pair of inflatable members which are made of flexible material, thus the covering can be folded while the inflatable members are deflated.

BRIEF DESCRIPTION OF THE DRAWINGS

The present invention is illustrated by way of example in the accompanying drawings, in which:

FIG. 5 is a top plan view of an exemplary application using the above-mentioned embodiment;

FIG. 6 is the sectional view of C—C line shown in FIG. 5; and

DETAILED DESCRIPTION OF THE INVENTION

Figure 1:
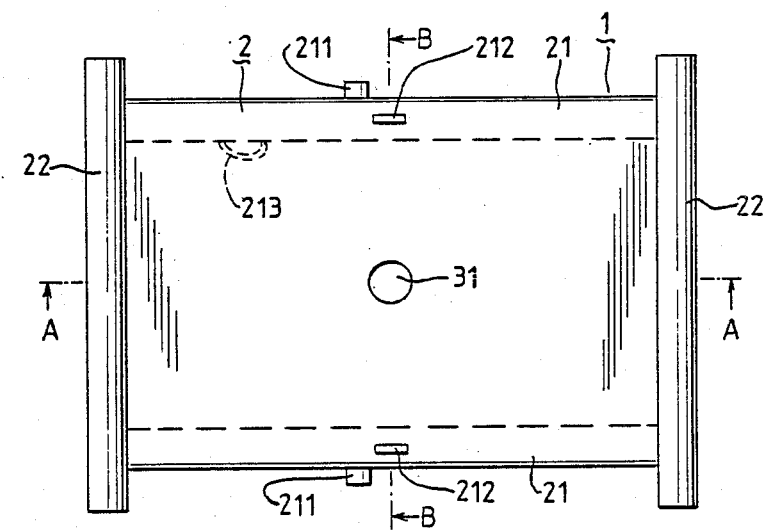
FIG. 1 is a top view of an embodiment of the covering according to the present invention.
Figure 2:
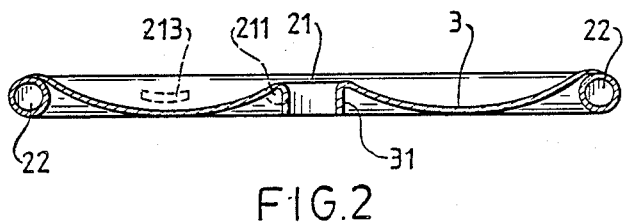
FIG. 2 is the sectional view of A—A line shown in FIG. 1.
Figure 3:
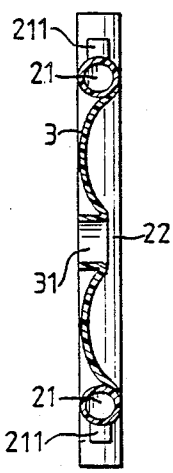
FIG. 3 is the sectional view of B—B line shown in FIG. 1.

Referring to FIG. 1, FIG. 2 and FIG. 3, the covering 1 of the present invention has a floating member 2 and a water-proof sheet 3, both made of a synthetic plastic. The floating member 2 is shaped as a square loop having two pairs of opposite portions, one pair of which being a pair of inflatable elongated portions 21, 21 which are made of flexible material and the other being a pair of elongated hard portions 22, 22, each elongated hard portion interconnecting adjacent ends of the inflatable elongated portions 21, 21. Each inflatable elongated portion 21 has an inflation inlet 211 and a fixing lug 212 respectively mounted thereon. There is a fastener 213 mounted on the internal surface of one inflatable elongated portion 21, as shown in the upper sides of the figures. The water-proof sheet 3 is loosely stretched inside the square-shaped loop of the floating member 2, the peripheral edge of which is tightly connected with the same. There is a nipple 31 downwardly formed on the central portion of the water-proof sheet 3 and upwardly communicated with the upper side of the same.

Figure 4:
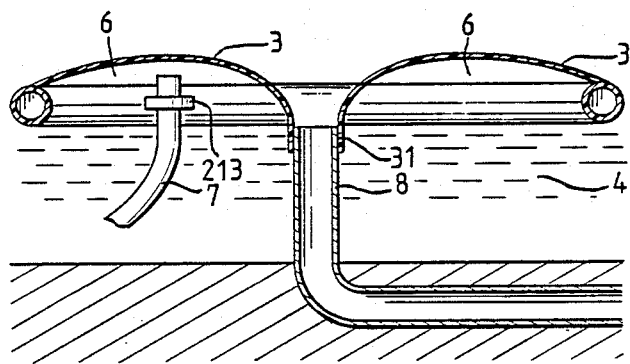
FIG. 4 is a similar view of FIG. 2 but the covering is disposed on water and the space between the water-proof sheet and the water has been filled with air.

Referring to FIG. 4, the covering 1 can float on the water 4 by means of the floating member 2. In operation, the nipple 31 formed in the water-proof sheet 3 is usually connected with a pipe 8 which extends away from the water 4. In addition, while the inflatable elongated portions 21, 21 of the floating member 2 are inflated via the inflation inlets 211, 211 shown in FIG. 1 and FIG. 2, the water under the water-proof sheet 3 will be tightly shielded by the covering 1 and the space 6 defined by the water-proof sheet 3, the floating member 2 and the water 4 will be able to be filled with air via an air tube 7 extended through the water 4 into the space 6 and fixed by the fastener 213. Therefore, the covering 1 can constitute an air cushion for insulating the water which is under the water-proof sheet 3 from the environmental atmosphere.

Figure 7:
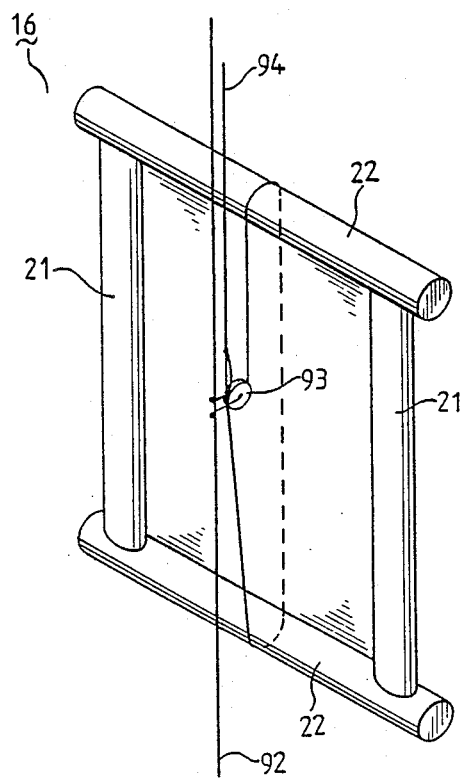
FIG. 7 is a perspective view of an example of a means for winding up the covering.

Shown in FIG. 5 is a top plan view of an exemplary application using the above-mentioned embodiment. FIG. 6 is the sectional view of C—C line shown in FIG. 5. In these figures, six sets of coverings 11, 12, 13, 14, 15, 16 are mounted on the water 41 of a nursery pool 9 and disposed in fixed positions by tying their lugs 212 together by means of the ropes 95. While all the coverings 11, 12, 13, 14, 15, 16 are extended, the water surface of the nursery pool 9 will almost totally be shielded by them. Therefore, the crops raised in the nursery pool 9 can be protected from sunburn or frost. And, while all the inflatable elongated portions 21 are further inflated by air which is supplied via the air tubes 91 and from the air source A, almost all the water 41 of the nursery pool 9 will be tightly insulated from the environmental atmosphere. Therefore, the crops raised in the nusery pool 9 can be protected from damage by extraordinary temperatures and the water 41 of the nursery pool 9 can be kept from pollution by acid rain because the acid rain will be collected on the surface of the water-proof sheets 31 and guided via the pipes 81 away from the nusery pool 9. In addition, if the weather is terribly cold, the spaces 6, as shown in FIG. 4, can be filled with air which is supplied via air tubes 71 and from air source B to constitute an air cushion for further insulating the water from the environmental atmosphere. As shown in FIG. 5, the coverings 11, 12, 13, 14, 15, 16 can be wound up. Referring to FIG. 7 and the covering 16 shown in FIG. 5, in this exemplary application, a cable 92 is extended above the central line which is parallel to the inflatable elongated portions 21 and perpendicular to the elongated solid portions 22. A pulley block 93 is hung from the cable 92, which is disposed almost directly above the central point of the covering 16. The wire 94 of the pulley block 93 has a looped end which is looped around the covering 16 along its central line. Therefore, when the wire 94 is pulled as the inflatable elongated portions 21 are being deflated, the covering 16 will be wound up and the nursery pool 9 will be open to the atmosphere. The using mode can be selected to correspond with the need, which is determined by the type of crop and the weather conditions.

While the invention has been described in connection with what is presently considered to be the most practical and preferred embodiment, it is to be understood that the invention is not to be limited to the disclosed embodiment, but, on the contrary, is intended to cover various modifications and equivalent arrangements included within the spirit and scope of the broadest interpretation so as to encompass all such modifications and equivalent arrangements.

I claim:

1. A covering adapted to be used to protect the water conditions of a nursery pool from damage by extraordinary weather, comprising a floating member shaped as a closed loop, which has two pairs of opposite elongated portions, one pair of said opposite elongated portions being a pair of inflatable members made of flexible material, the other pair of said opposite elongated portions being a pair of floatable hard members, and a water-proof sheet which is loosely stretched inside the closed loop of the floating member, the peripheral edge of which is tightly connected to the same, said water-proof sheet loosely stretched such that an air cushion can be formed between said covering and the water to be protected by said covering, whereby said covering can be separately wound around the pair of floatable hard members along the pair of inflatable members while the pair of inflatable members are deflated, and said covering can form an air cushion by pumping air into the space defined by said covering and the covered water so that the water protected by said covering can be insulated from the open air surface to be covered.

2. A covering as claimed in claim 1, wherein the water-proof sheet further comprises at least one nipple downwardly formed thereon, the nipple being adapted to guide the rain water collected to the top surface of the water-proof sheet via a tube additionally connected with the nipple away from the covering.

3. A covering as claimed in claim 2, wherein each inflatable member has an inflation inlet mounted thereon.

* * * * *